US011307286B1

(12) United States Patent
Wang et al.

(10) Patent No.: US 11,307,286 B1
(45) Date of Patent: Apr. 19, 2022

(54) WIRELESS FINGERPRINT RECONSTRUCTION FOR ACCURATE LOCATION CONFIRMATION

(71) Applicant: Amazon Technologies, Inc., Seattle, WA (US)

(72) Inventors: Zheng Wang, Sammamish, WA (US); Shao-Wen Yang, Redmond, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 16/900,004

(22) Filed: Jun. 12, 2020

(51) Int. Cl.
*G01S 5/02* (2010.01)
*G06Q 10/08* (2012.01)
*G06N 20/00* (2019.01)

(52) U.S. Cl.
CPC .......... *G01S 5/02527* (2020.05); *G06N 20/00* (2019.01); *G06Q 10/083* (2013.01)

(58) Field of Classification Search
CPC ..... H04W 64/00; H04W 4/02; G01S 5/02527; G06N 20/00; G06Q 10/083
See application file for complete search history.

(56) References Cited

U.S. PATENT DOCUMENTS

| | | | | |
|---|---|---|---|---|
| 2017/0371024 A1* | 12/2017 | Ivanov | .................. | H04W 4/029 |
| 2018/0352379 A1* | 12/2018 | Kong | .................... | G01S 5/0263 |
| 2020/0304953 A1* | 9/2020 | Georgy | ................. | H04W 4/029 |

\* cited by examiner

*Primary Examiner* — Charles N Appiah
*Assistant Examiner* — Frank E Donado
(74) *Attorney, Agent, or Firm* — Thomas | Horstemeyer, LLP

(57) ABSTRACT

Disclosed are various embodiments for estimating missing wireless attributes of a wireless fingerprint generated for a given location and confirming that the given location is a correct location. A collection of wireless fingerprint samples for the given location can be used to train an attribute prediction model that can estimate missing attributes in wireless fingerprints. For example, a wireless fingerprint may be incomplete as the fingerprint may fail to include attribute data for some AP devices associated with the given location. The attribute prediction model can be used to reconstruct wireless fingerprints to include the missing attributes. The reconstructed wireless fingerprints can then be used to train a location confirmation model which can be used for accurate location confirmation.

20 Claims, 6 Drawing Sheets

WIRELESS FINGERPRINT RECONSTRUCTION FOR ACCURATE LOCATION CONFIRMATION

BACKGROUND

In a product fulfillment context, delivery confirmation involves ensuring that ordered items are delivered to the appropriate recipients at their specified delivery location. Lacking an accurate delivery confirmation can cause not only customer frustration (e.g., a customer reports that an item is not received) but also driver frustration (e.g., when a driver is unable to locate a particular location). Delivery agents can use global positioning system (GPS) devices to provide a route to a delivery address provided by the intended recipient. Even with GPS systems, delivery agents can have difficulty identifying the appropriate physical location of the delivery address.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
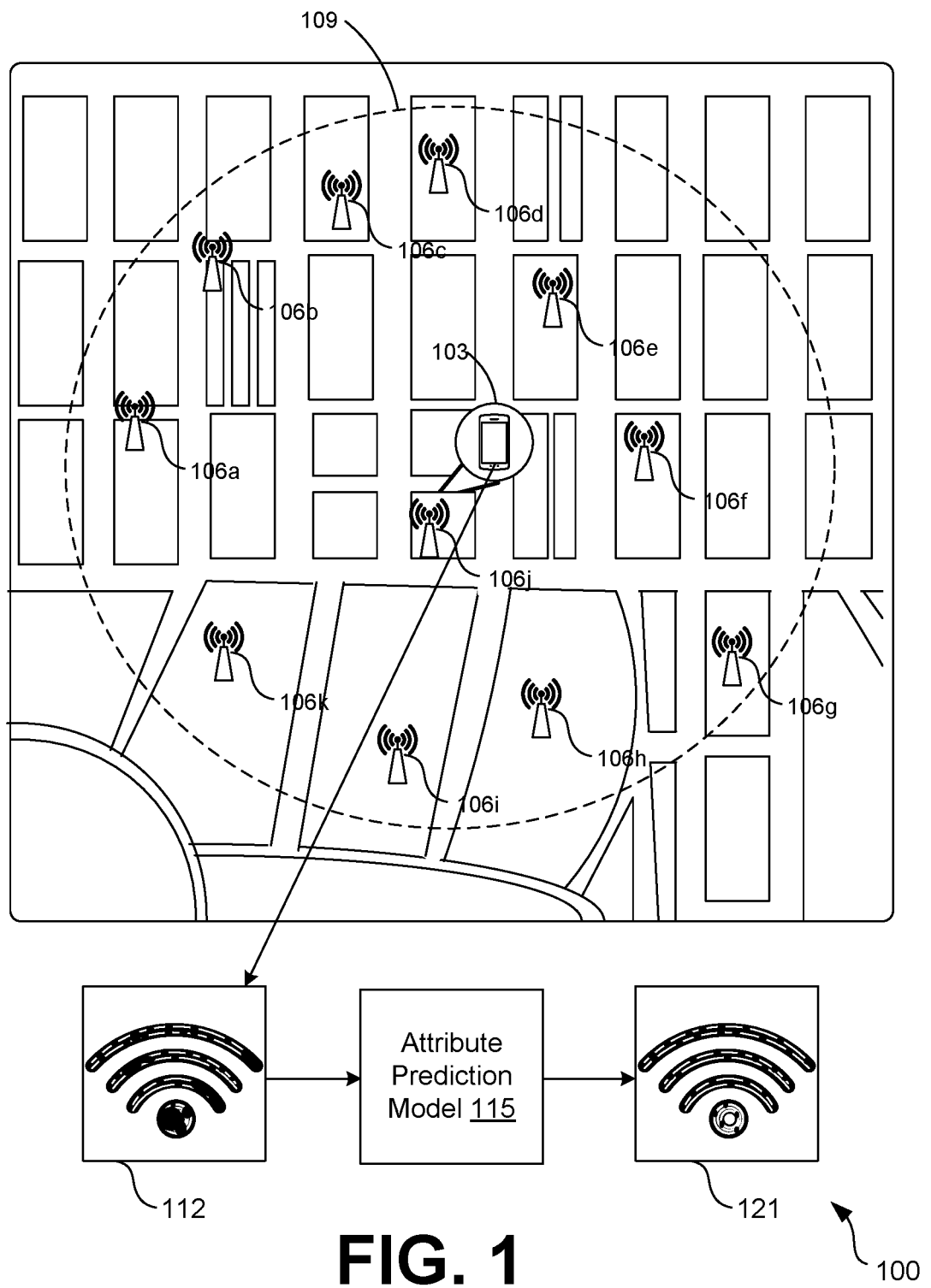
FIG. 1 is a drawing of an example scenario related to wireless localization according to various embodiments of the present disclosure.

The present disclosure relates to estimating missing wireless attributes of a wireless fingerprint generated for a given location and confirming that the given location is a correct location (e.g., delivery address) using an imputed wireless fingerprint that includes the estimated missing wireless attributes. In particular, the computing device can perform a passive or active wireless scan of a given network (e.g., a wireless fidelity (Wi-Fi) network, a Bluetooth network, a Zigbee network, a Near Field Communication (NFC) network, etc.) to identify access point (AP) devices surrounding a given location. A wireless fingerprint corresponds to a unique signature for a given location according to attributes of surrounding AP devices. As such, a wireless fingerprint may be generated using attribute data (e.g., signal strength, distance between devices, etc.) received from or otherwise associated with the identified AP devices.

However, the wireless fingerprint can be incomplete by failing to include attribute data for all of the AP devices associated with the given location. According to various embodiments, multiple fingerprint samples obtained at the given location can be used to generate an attribute prediction model that can be used to estimate missing attributes for a given wireless fingerprint. Accordingly, an imputed or otherwise reconstructed wireless fingerprint that includes the estimated missing attributes from an obtained wireless fingerprint can be used for accurate wireless localization.

Typically, location confirmation, as well as all wireless localization techniques, include two phases: the survey phase and the online confirmation phase. In the survey phase, wireless fingerprints are collected from various locations and a machine learning algorithm is applied to generate a fingerprint model for a given location. For example, the surveyed wireless fingerprints may be collected silently from past successful deliveries for each delivery location. In this example, when a delivery agent delivers an item, the delivery agent can interact with a delivery application to confirm that an item was delivered. In response, the delivery application may identify AP devices in the surrounding area to generate a wireless fingerprint that can be used during the survey phase. Various approaches for collecting wireless fingerprints are described in U.S. patent application Ser. No. 16/900,057 entitled "LOCATION CONFIRMATION USING CROWDSOURCED WIRELESS FINGERPRINTS," filed Jun. 12, 2020, which is incorporated by reference herein in its entirety.

In the online confirmation phase, a wireless fingerprint is collected from a wireless scan when the transporter (e.g., scanning delivery device) arrives at the delivery destination. The transporter's real-time wireless fingerprint is compared against the fingerprint model or location confirmation model for the target delivery location. The comparison result can be used to confirm if the destination location of the transporter is the targeted delivery location.

However, wireless fingerprinting can be highly dimensional as there are multiple types of attributes that make up a wireless fingerprint. In addition, wireless scanning can be opportunistic. For each location, the amount of surrounding access point (AP) devices (e.g., wireless APs) can be different resulting in variational dimensionality in wireless fingerprints. Due to the design and implementation (e.g., hardware and software) of wireless scanning, wireless scanning cannot guarantee retrieving signal attributes from all surrounding AP devices. Thus, a wireless fingerprint will likely only contain a subset of the surrounding network devices.

Using Wi-Fi passive scanning as an example, the scanning device may hop over frequency channels and stay in each channel for a short period of time (e.g., 100 milliseconds) to detect potential access point probe frames. There are eleven channels in the Wi-Fi 2.4 GHz spectrum. From each received probe frame, the signal attributes, including the basic service set identifier (BSSID), the service set identifier (SSID), and the received signal strength indicator (RSSI), etc., are extracted. However, channel hopping can make Wi-Fi scanning unreliable. For example, a probe frame may not be sent timely. Further, should the probe frame be sent, the scanning device may not receive the probe frame due to environment noises or other factors. Furthermore, current industry standards for wireless scanning do not require AP devices to provide information to requesting scanning devices.

The unseen access points (e.g., the missing values or attributes of a wireless fingerprint) can cause challenges to both the survey and the online confirmation phases. In the survey phase, the missing values will decrease the accuracy in model parameters estimation (e.g., the mean and variance of an AP device). Furthermore, many machine learning (ML) algorithms require a fixed size input and missing values will exclude these families of ML algorithms. To compensate, more training samples are required for accurate parameter estimation. Modifications are required for ML algorithms to take variable size input. Such modifications will introduce extra parameters as well as potential degradations to the algorithms. In the online confirmation phase, the accuracy of distance metrics used for comparison may suffer from missing values in fingerprints.

According to various embodiments of the present disclosure, signal attributes can be estimated from unseen AP devices (e.g., the missing values of a wireless fingerprint). An objective of the present disclosure is to impute (or reconstruct) the missing signal attributes as close as possible to the actual signal attributes, should they have been seen. By being able to modify an obtained wireless fingerprint to include missing attributes of unseen AP devices, the accuracy of wireless localization technologies can be improved. Although the discussion in the present disclosure refers primarily to Wi-Fi networks, it should be noted that the examples of the present disclosure can be used with all wireless protocols including, for example, Wi-Fi®, Bluetooth®, Near Field Communication (NFC), Zigbee®, Z-Wave®, 6LoWPAN, Radio Frequency Identification (RFID), cellular 4G network, cellular 5G network, and other wireless protocols.

Turning now to FIG. 1, shown is an example scenario 100 associated with a delivery agent making a delivery at a given location and using the embodiments of the present disclosure for accurate delivery confirmation. For example, a delivery agent can interact with a client device 103 when delivering an item at a given location to confirm accuracy of the given location. FIG. 1 shows multiple wireless AP devices 106 (e.g., 106a, 106b, 106c, 106d, 106e, 106f, 106g, 106h, 106i, 106j, and 106k) positioned in various locations within a surrounding area 109 of the location of the client device 103. The example scenario of FIG. 1 can be used to illustrate both the survey phase and the online confirmation phase associated with wireless localization techniques (e.g., location confirmation).

In the survey phase, each time a delivery agent delivers an item at a given location, the client device 103 can perform a wireless scan to identify wireless AP devices 106 in the surrounding area 109 and generate a collected wireless fingerprint 112 using the attributes received from each of the collected wireless AP devices 106. Due to hardware and software limitations in wireless scanning, the client device 103 may identify only a subset of the available wireless AP devices 106 in the surrounding area 109. As such, the collected wireless fingerprint 112 generated according to the scan may be incomplete. In addition, every time a wireless scan is performed at the given location, the generated collected wireless fingerprint 112 may differ from a previously generated collected wireless fingerprint 112 since the client device 103 may identify a different subset of wireless AP devices 106.

The samples of the collected wireless fingerprints 112 collected over a period of time can be used to generate an attribute prediction model 115. Typically, in the survey phase, the samples of collected wireless fingerprints 112 are used to generate location confirmation models 118 (FIG. 2) (e.g., fingerprint models) that can be used for location confirmation based on wireless fingerprinting techniques. However, according to various embodiments, the collected samples are first used to train or otherwise generate an attribute prediction model 115 for the given location. The attribute prediction model 115 can be trained to estimate missing attributes for a given obtained collected wireless fingerprint 112. Upon training of the attribute prediction model 115, imputed wireless fingerprints 121 can be generated according to the samples of the collected wireless fingerprints 112 and the attribute prediction model 115. The imputed wireless fingerprints 121 can then be used to generate location confirmation models 118 for the given location. Because the imputed wireless fingerprints 121 are generated to included estimated missing data, the imputed wireless fingerprints 121 can be considered to be more robust in training an accurate location confirmation model 118 that more accurately reflects the wireless AP environment for the given location.

The online confirmation phase corresponds to the use of the trained location confirmation models 118 to confirm that a particular location is the correct location. Using the example of FIG. 1, a delivery agent can interact with his or her client device 103 to confirm whether a present location is the accurate delivery location for a delivery of an item. The client device 103 can perform a wireless scan to identify wireless AP devices 106 in the given area. The client device 103 can obtain and/or determine attribute data (e.g., signal strength, device identifier, location of given wireless AP device 106, a distance between the client device 103 and a given wireless AP device 106, etc.) from the identified AP devices 106 and generate a collected wireless fingerprint 112 for the given location.

However, as the scan may only include a subset of wireless AP devices 106 in the surrounding area 109, the collected wireless fingerprint 112 may be incomplete. As such, the client device 103 can apply a previously trained attribute prediction model 115 for the given location to estimate the missing attributes needed to generate an imputed wireless fingerprint 121 that is more complete. Upon generating the imputed wireless fingerprint 121, the client device 103 can compare a previously generated location confirmation model 118 with the generated imputed wireless fingerprint 121 to confirm a delivery location. If the imputed wireless fingerprint 121 is within a threshold of expectation defined by the location confirmation model 118, the delivery location can be confirmed as being accurate. Otherwise, the delivery agent may receive a notification rendered on the client device 103 indicating that the delivery location is incorrect. In the following discussion, a general description of the system and its components is provided, followed by a discussion of the operation of the same.

Figure 2:
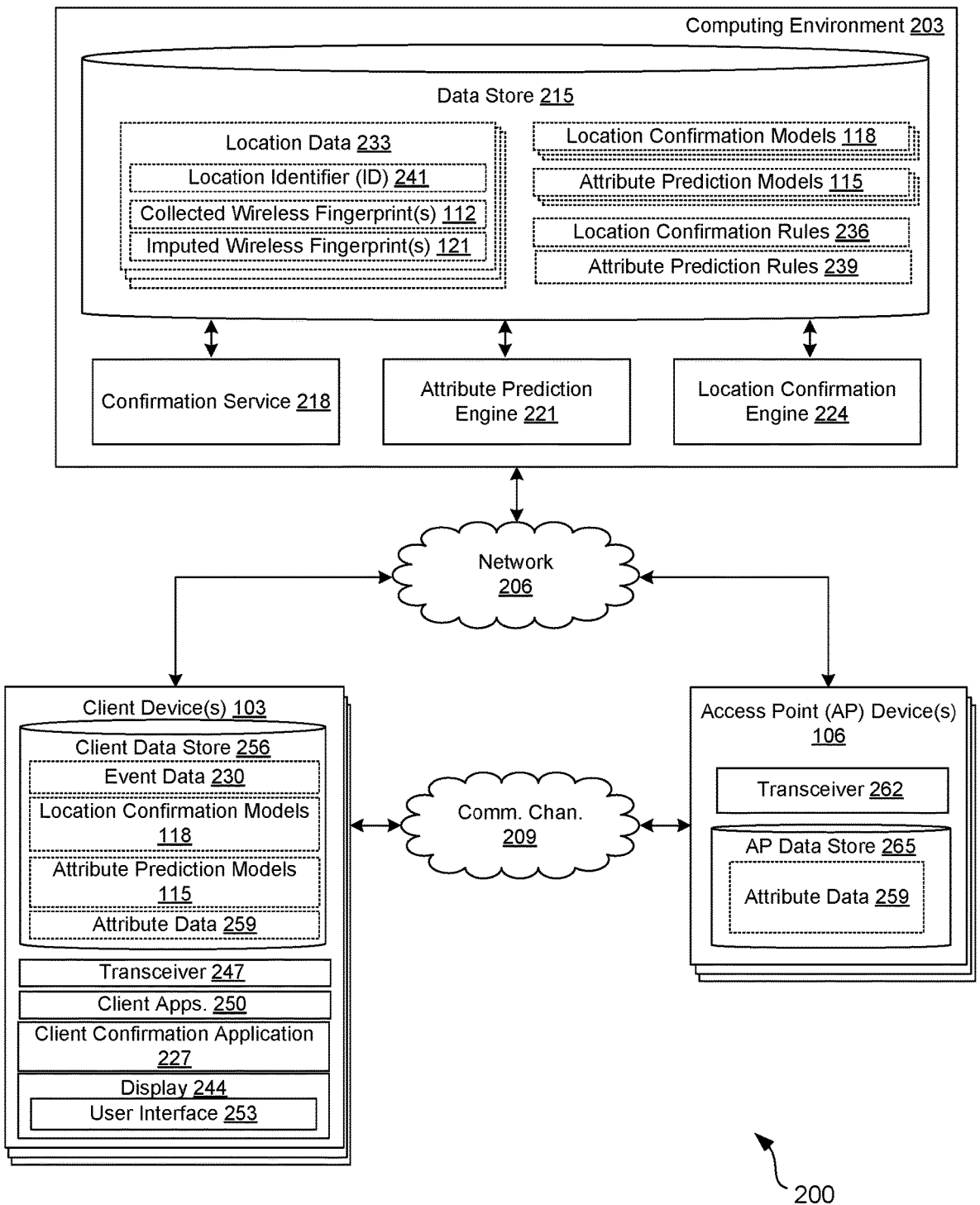
FIG. 2 is a schematic block diagram of a networked environment according to various embodiments of the present disclosure.

With reference to FIG. 2, shown is a networked environment 200 according to various embodiments. The networked environment 200 includes a computing environment 203, a client device(s) 103, and one or more wireless AP devices 106 which are in data communication with each other via a network 206. The network 206 includes, for example, the Internet, intranets, extranets, wide area networks (WANs), local area networks (LANs), wired networks, wireless networks, cable networks, satellite networks, or other suitable networks, etc., or any combination of two or more such networks.

Additionally, the client device 103 and the wireless AP devices 106 may be in data communication with each other via a communication channel 209. In some respects, the communication channel 209 can represent a direct peer-to-peer communication channel between the client device 103 and one or more wireless AP devices 106. In some examples, the communication channel 209 can include a Wi-Fi network, a Bluetooth network, a Zigbee network, a Near Field Communication (NFC) network, and other suitable wireless protocols. In the context of the present disclosure, the communication channel 209 can also be referred to as a network for data communications.

The computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a hosted computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 215 that is accessible to the computing environment 203. The data store 215 may be representative of a plurality of data stores 215 as can be appreciated. The data stored in the data store 215, for example, is associated with the operation of the various applications and/or functional entities described below.

The components executed on the computing environment 203, for example, include a confirmation service 218, an attribute prediction engine 221, a location confirmation engine 224, and other applications, services, processes, systems, engines, or functionality not discussed in detail herein.

The confirmation service 218 is executed to interact with a client confirmation application 219 executed on the client device 103 to validate or otherwise confirm that the appropriate delivery driver is at the correct delivery location for a delivery of a package. In some examples, the confirmation service 218 can obtain collected wireless fingerprints 112 that are generated by a client device 103 and store the collected wireless fingerprints 112 in the data store 215 in association with the particular location for use in generating attribute prediction models 115 and location confirmation models 118.

The confirmation service 218 can further obtain event data 230 from the client device 103 or other appropriate source. The event data 230 may comprise data associated with one or more known events (e.g., delivery of items) that are planned to occur during a given period of time with respect to a particular entity (e.g., delivery agent). For example, the event data 230 may comprise route data corresponding to the route of deliveries that a delivery agent may take during a particular day. The confirmation service 218 can use the event data 230 to determine location data for the one or more events during the given period of time. The location data can include a street address, geographic coordinates, a geo-fence boundary, and other location identifying information. The confirmation service 218 can identify generated location confirmation models 118 and attribute prediction models 115 according to the identified locations in the event data 230 and transmit the identified models to the client device 103. As such, the client device 103 can use the location confirmation models 118 and attribute prediction models 115 for accurate location confirmation.

The attribute prediction engine 221 is executed to generate attribute prediction models 115 for a given location. The attribute prediction engine 221 can obtain samples of the collected wireless fingerprints 112 for the given location and use the collected wireless fingerprints 112 to generate the attribute prediction engine 221 according to the attribute prediction rules 239. In some examples, the attribute prediction engine 221 analyzes the collected wireless fingerprints 112 to learn statistics associated with each AP device 106 associated with the given location and learn the covariance of each AP device 106 and its neighbor AP device 106.

In some examples, the attribute prediction engine 221 can select a subset of available collected wireless fingerprints 112 for a given location. For example, the attribute prediction engine 221 can select a subset of available collected wireless fingerprints 112 based at least in part on a recency of collection (e.g., timestamps associated with the collected wireless fingerprints 112), an identified change in the AP environment for a given location (e.g., addition or removal of AP device 106), a number of required samples, a success of an associated delivery, or other factors.

The location confirmation engine 224 is executed to generate location confirmation models 118 for a given location using machine learning algorithms and other models or rules included in the location confirmation rules 236. In particular, the location confirmation engine 224 applies the location confirmation rules 236 and uses the imputed wireless fingerprints 121 to generate location confirmation models 118 that include fingerprint models for a given location. According to various embodiments, the generated location confirmation models 118 can be used to confirm locations associated with a delivery.

The data stored in the data store 215 includes, for example, location data 233, location confirmation models 118, attribute prediction models 115, location confirmation rules 236, attribute prediction rules 239, and potentially other data.

The location data 233 can include information associated with a given location associated with a location identifier (ID) 241. The location identifier 241 can include a street address, geographic coordinates, a geo-fence boundary, and/or other location identifying information. In some examples, the location identifier 241 can correspond to a given location associated with a given address. For example, the location identifier 241 can correspond to an apartment number in an apartment complex, a front door of a given address, a back door of a given address, a garage location for a given address, and/or other location as can be appreciated. The location data 233 can further include the samples of collected wireless fingerprints 112 obtained from client devices 103 at the given location. The location data 233 can further include the imputed wireless fingerprints 121 that are generated using an attribute prediction model 115 that is generated for the given location.

The location confirmation models 118 include location confirmation models 118 generated by the location confirmation engine 224 for different locations. In particular, the location confirmation models 118 include fingerprint models that are generated according to various machine learning techniques defined by the location confirmation engine 224. According to various embodiments, the location confirmation models 118 can be compared to an imputed wireless fingerprint 121 generated using a collected wireless fingerprint 112 obtained by the client device 103. If the comparison of the imputed wireless fingerprint 121 with the location confirmation model 118 results in a score that is within a given threshold, the location can be considered to be accurate.

In some embodiments, the location confirmation models 118 can be stored in the data store 215 in association with the location data 233. In other embodiments, the location confirmation models 118 can be stored separately in the data store 215 from the location data 233. In other embodiments, the location confirmation models 118 may be stored in a repository or other data store that is separate from the data store 215.

The attribute prediction models 115 may be generated by the attribute prediction engine 221 for different locations. In particular, the attribute prediction models 115 are generated to estimate missing attributes in collected wireless fingerprints 112. For example, a given collected wireless fingerprint 112 may be generated using attributes for only a subset of AP devices 106 associated with a given location. By obtaining samples of collected wireless fingerprints 112, patterns and statistics associated with the different AP devices 106 can be determined using the attribute prediction rules 239. In addition, the covariance of each AP device 106 and its neighbor AP device 106 can be determined. This information in conjunction with machine learning algorithms can be used to generate attribute prediction models 115 that can estimate missing attributes for a given collected wireless fingerprint 112. As such, the attribute prediction models 115 can be used to generate imputed wireless fingerprints 121 that reconstruct the collected wireless fingerprint 112 to include the missing attribute data.

The location confirmation rules 236 include rules, models, and/or configuration data for the various algorithms or approaches employed by the location confirmation engine 224. For example, the location confirmation rules 236 can include the various models and/or algorithms used by the location confirmation engine 224 in generating location confirmation models 118 for a given location.

The attribute prediction rules 239 include rules, models, and/or configuration data for the various algorithms or approaches employed by the attribute prediction engine 221. For example, the attribute prediction rules 239 can include the various models and/or algorithms used by the attribute prediction engine 221 in generating attribute prediction models 115 for a given location.

The client device 103 is representative of a plurality of client devices that may be coupled to the network 206 and/or the communication channel 209. The client device 103 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, smart-watches, head mounted displays, voice interface devices, or other devices. The client device 103 may include a display 244. The display 244 may comprise, for example, one or more devices such as liquid crystal display (LCD) displays, gas plasma-based flat panel displays, organic light emitting diode (OLED) displays, electrophoretic ink (E ink) displays, LCD projectors, other types of display devices, etc.

The client device 103 can also include a radio frequency (RF) transceiver 247 for communicating via the network 206 and/or the communication channel 209. The RF transceiver 247 can be representative of a plurality of different transceivers in the client device 103, such as a Wi-Fi transceiver, a Bluetooth transceiver, Zigbee transceiver, a cellular transceiver, a Near Field Communication (NFC) transceiver, a radio frequency identification (RFID) transceiver, or other suitable transceivers. The client device 103 can also be equipped with a microphone, a speaker, a light emitting device, a location detecting device (e.g., a GPS unit), sensors, and other suitable components for a mobile device.

The client device 103 may be configured to execute various applications such as client application(s) 250, the client confirmation application 227, and/or other applications. The client application(s) 250 may be executed in a client device 103, for example, to access network content served up by the computing environment 203 and/or other servers, thereby rendering a user interface 253 on the display 244. To this end, the client application 250 may comprise, for example, a browser, a dedicated application, etc., and the user interface 253 may comprise a network page, an application screen, etc. The client device 103 may be configured to execute applications beyond the client application 250 such as, for example, email applications, social networking applications, word processors, spreadsheets, and/or other applications.

The client confirmation application 227 can comprise a client application 250 that interacts with the confirmation service 218 in the computing environment 203. For example, the client confirmation application 227 can obtain location confirmation models 118 and attribute prediction models 115 from the confirmation service 218 for locations defined in the event data 230. The client confirmation application 227 can identify AP devices 106 associated with a given location and generate a collected wireless fingerprint 112 using the attribute data 259 obtained from the identified AP devices 106. In various embodiments, the client confirmation application 227 can generate an imputed wireless fingerprint 121 using the obtained attribute prediction model 115 for the given location and the collected wireless fingerprint 112. Upon generating the imputed wireless fingerprint 121, the client confirmation application 227 can compare the imputed wireless fingerprint 121 with the obtained location confirmation model 118 for the given location to confirm an accuracy of the client device location.

Also, various data is stored in a client data store 256 that is accessible to the client device 103. The client data store 256 may be representative of a plurality of data stores as can be appreciated. The data stored in the client data store 256, for example, is associated with the operation of various applications and/or functional entities described herein. The client data store 256 may store data received from the computing environment 203 and/or the AP device 106, such as event data 230, location confirmation models 118, attribute prediction models 115, attribute data 259, and other data as can be appreciated.

The wireless AP device 106 is representative of a plurality of client devices that may be coupled to the network 206 and/or the communication channel 209. In some examples, the wireless AP device 106 may comprises one of the client devices 103. The wireless AP device 106 can refer to a network access point that provides the client devices 103 with access to corresponding networks. The wireless AP device 106 may also comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability.

The wireless AP device 106 can also include a transceiver 262 for communicating via the network 206 and/or the communication channel 209. The transceiver 262 can represent a hardware component capable of wired or wireless data communication. The transceiver 262 can be representative of a plurality of different transceivers in the wireless AP device 106, such as an Ethernet transceiver, a Wi-Fi transceiver, a Bluetooth transceiver, Zigbee transceiver, a Near Field Communication (NFC) transceiver, a radio frequency identification (RFID) transceiver or other suitable transceivers.

Also, various data is stored in an AP data store 265 that is accessible to the wireless AP device 106. The AP data store 265 may be representative of a plurality of AP data stores 265 as can be appreciated. The data stored in the AP data store 265, for example, is associated with the operation of the various applications and/or functional entities described herein. The AP data store 265 may include attribute data 259 and other client data. The attribute data 259 can include an SSID, BSSID, location identifier 241, signal strength, type of device, and/or other data.

Figure 3:
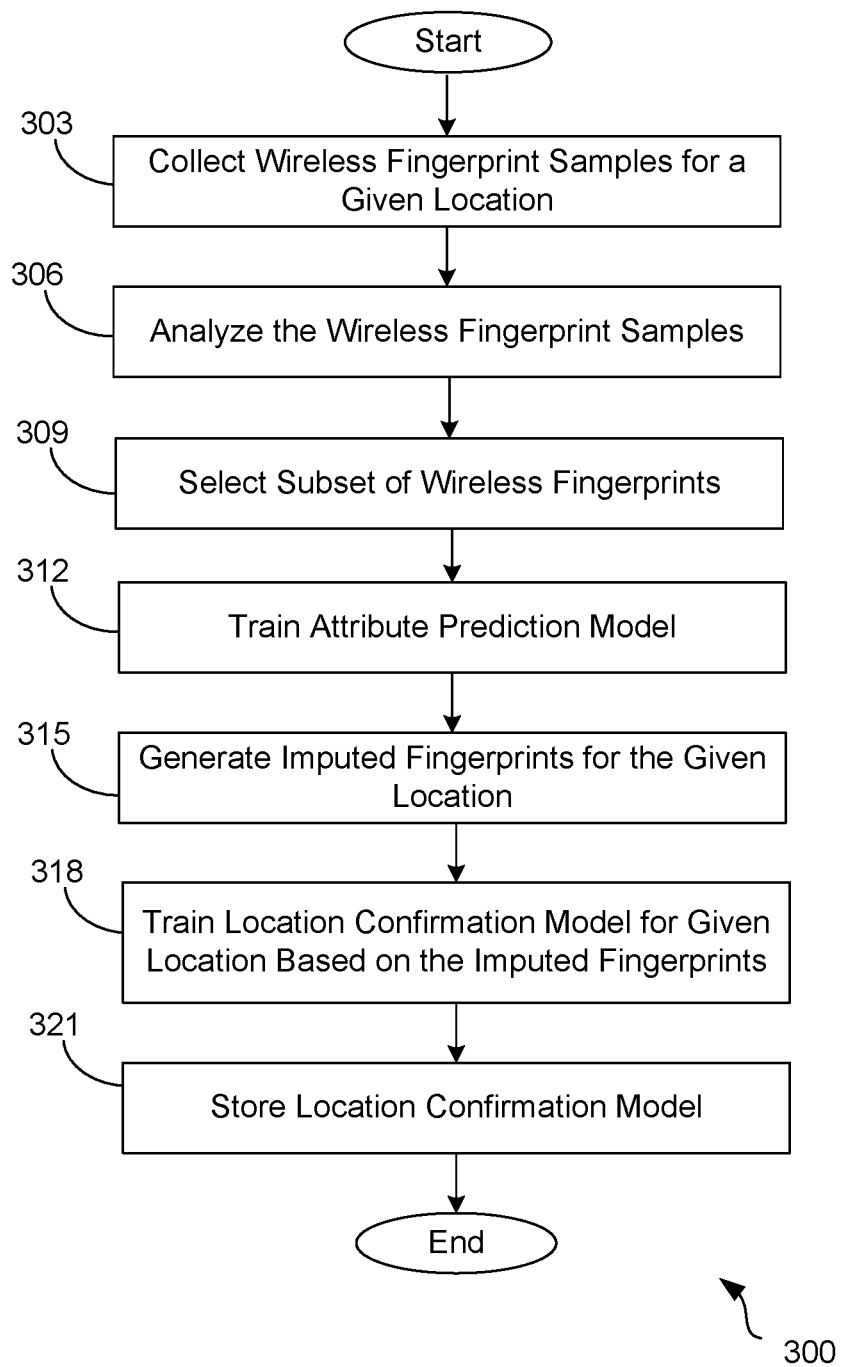
FIG. 3 is a flowchart illustrating one example of functionality implemented as portions of a confirmation service, an attribute prediction engine, and a location confirmation engine executed in a computing environment in the networked environment of FIG. 2 according to various embodiments of the present disclosure.

Next, a general description of the operation of the various components of the networked environment 200 is provided with reference to FIGS. 3-6. To begin, FIG. 3 illustrates a flowchart 300 that provides one example of the operation of portions of the confirmation service 218 (FIG. 2), the attribute prediction engine 221 (FIG. 2), and the location confirmation engine 224 (FIG. 2) according to various embodiments. It is understood that the flowchart of FIG. 3 provides merely an example of the many different types of functional arrangements that may be employed to implement the operation of the portions of the confirmation service 218, the attribute prediction engine 221, and the location confirmation engine 224 as described herein. As an alternative, the flowchart of FIG. 3 may be viewed as depicting an example of elements of a method implemented in the computing environment 203 (FIG. 2) according to one or more embodiments.

FIG. 3 provides a non-limiting example of the functionality that may be performed by the confirmation service 218, the attribute prediction engine 221, and the location confirmation engine 224 during the survey phase of wireless localization. Specifically, FIG. 3 provides a non-limiting example of collecting wireless fingerprints 112 (FIG. 1), training attribute prediction models 115 (FIG. 1) based on the collected wireless fingerprints 112, and training location confirmation models 118 (FIG. 2) according to imputed wireless fingerprints 121 (FIG. 2) that include missing attribute data 259 (FIG. 2) estimated using the trained attribute prediction models 115.

At box 303, the confirmation service 218 collects samples of collected wireless fingerprints 112 according to various embodiments. The wireless fingerprints 112 may be received by a client device 103 (FIG. 1) that generates the wireless fingerprints 112 in response to performing a wireless scan to obtain attribute data 259 from surrounding AP devices 106 (FIG. 1) in the surrounding area 109 (FIG. 1) of the location of the client device 103. The wireless fingerprints 112 can be generated by the client device 103 in response to an individual arbitrarily walking around the proximity of the target location and using his or her client device 103 to collect the samples, by performing a delivery of an item at the target location, and/or other method of collecting samples, as can be appreciated. In some examples, the samples are collected based at least in part user interaction with his or her client device. In other examples, the samples are collected in the background without user intervention. In response to generating the collected wireless fingerprints 112, the client confirmation application 227 (FIG. 2) can transmit the collected wireless fingerprints 112 to the confirmation service 218. In various embodiments, the confirmation service 218 stores the received collected wireless fingerprints 112 in the data store 215.

At box 306, the attribute prediction engine 221 can identify and/or analyze the attributes of each received collected wireless fingerprint 112. For example, the attributes can include the signal strength (e.g., RSSI), a location of the identified AP device 106, a device identifier (e.g., BSSID, SSID), and other attributes as can be appreciated.

At box 309, the attribute prediction engine 221 may select at least a subset of the collected wireless fingerprints 112 for the given location. The selected wireless fingerprints 112 can be used for training the attribute prediction model 115 for the given location. For example, selection of the collected wireless fingerprints 112 can be based at least in part on a recency of collection (e.g., timestamps associated with the collected wireless fingerprints 112), an identified change in the AP environment for a given location (e.g., addition or removal of AP device 106), a number of required samples, a success of an associated delivery at the given location, and/or other factors.

At box 312, the attribute prediction engine 221 trains the attribute prediction model 115 to learn how to reconstruct missing signal attributes from unseen AP devices 106. In particular, a matrix can be constructed for the collected wireless fingerprints 112, collected from a location where the rows are the fingerprints and columns are different AP devices 106. Due to the software and hardware limitations for devices with respect to wireless localization and scanning for AP devices 106, each collected wireless fingerprint 112 may include attributes for only a partial list of AP devices 106, leaving missing values in this matrix. Therefore, collaborative filtering algorithms can be applied to predict the missing values in the matrix.

Given a matrix $\psi \in \mathbb{R}^{m \times n}$ defined as $$\Psi = \begin{bmatrix} \psi_{1,1} & \cdots & \psi_{1,n} \\ \vdots & \ddots & \vdots \\ \psi_{m,1} & \cdots & \psi_{m,n} \end{bmatrix}$$

where n is the number of AP devices 106 and m is the number of collected wireless fingerprints 112. Each entry is the RSSI value ranging from 0 to −110 dB. According to matrix factorization, this matrix can be decomposed into two components as $$\Psi = P \times Q^T$$

where $P \in \mathbb{R}^{m \times k}$ and $Q \in \mathbb{R}^{n \times k}$ and k are the number of latent variables. In this matrix decomposition, the fingerprint (FP)-factor P and AP-factor Q are decoupled using the latent variables. In essence, the latent variables capture the joint distribution and dynamics of the AP variations and reflect the effects on the observed fingerprint samples. In this setup, each element in the matrix can be written as $$\psi_{i,j} = \sum_{k=1}^{K} p_{i,k} q_{k,j}$$

In reality, such decomposition will not have a closed form solution for most cases due to the sparsity of the $\Psi$ matrix. As such, the decomposition can be solved by the best estimation where $$\Psi \approx \tilde{\Psi} = \tilde{P} \times \tilde{Q}^T$$

The estimation can be solved by gradient descent by optimization of the following objective function:

$$e_{i,j}^2 = (\psi_{i,j} - \tilde{\psi}_{i,j})^2 = \left(\psi_{i,j} - \sum_{k=1}^{K} \tilde{p}_{i,k} \tilde{q}_{k,j}\right)^2$$

s.t. $\psi_{ij}$ is NOT missing

Inaccurate signal strength (e.g., RSSI) value estimation can have severe negative impact to the accuracy of location confirmation. Therefore, metrics are designed to evaluate the confidence of each signal strength value estimation from matrix factorization. For each $\tilde{P}$ and $\tilde{Q}$, the corresponding confidence matrices $\check{P}$ and $\check{Q}$ can be constructed such that $$\check{P}_{i,j} = \frac{\theta_{i,j}^P}{\Theta^P}, \check{Q}_{i,j} = \frac{\Theta_{i,j}^Q}{\Theta^Q}$$

where $\Theta$ is the maximum number of updates for each gradient descent iteration and $\theta_{i,j}$ is the actual updates received for each parameter. Together, the confidence of the estimation is $$\check{\Psi} = \check{P} \times \check{Q}^T$$

Finally, the matrix after data imputation is $$\psi_{i,j} = \begin{cases} \tilde{\psi}_{i,j}, & \psi_{i,j} \text{ is missing} \wedge \check{\Psi}_{i,j} \geq \tau \\ \psi_{i,j}, & \text{otherwise} \end{cases}$$

where $\tau$ is the confidence threshold.

At box 315, the attribute prediction engine 221 generates imputed wireless fingerprints 121 according to various embodiments of the present disclosure. The imputed wireless fingerprints 121 can be generated from a subset of collected wireless fingerprints 112 collected during the survey phase. In some examples, the imputed wireless fingerprints 121 are generated using one or more of the collected wireless fingerprints 112 used to train the attribute prediction model 115. In other examples, the imputed wireless fingerprints 121 are generated using samples of collected wireless fingerprints 112 that were not selected for training the attribute prediction model 115. The imputed wireless fingerprints 121 are generated to include the missing attributes of the unseen AP devices 106 according to the attribute prediction model 115.

At box 318, the location confirmation engine 224 trains a location confirmation model 118 for the given location according to the location confirmation rules 236 and imputed wireless fingerprints 121 generated for training the location confirmation model 118. In particular, the location confirmation engine 224 can use the imputed wireless fingerprints 121 that are generated to include the missing attribute data 259 of the unseen AP devices 106. The generated location confirmation model 118 for the given location can be compared to a wireless fingerprint obtained during the online phase of wireless localization.

At box 321, the location confirmation engine 224 stores the location confirmation model 118 for the given location in the data store 215. Thereafter, this portion of the process proceeds to completion.

Figure 4:
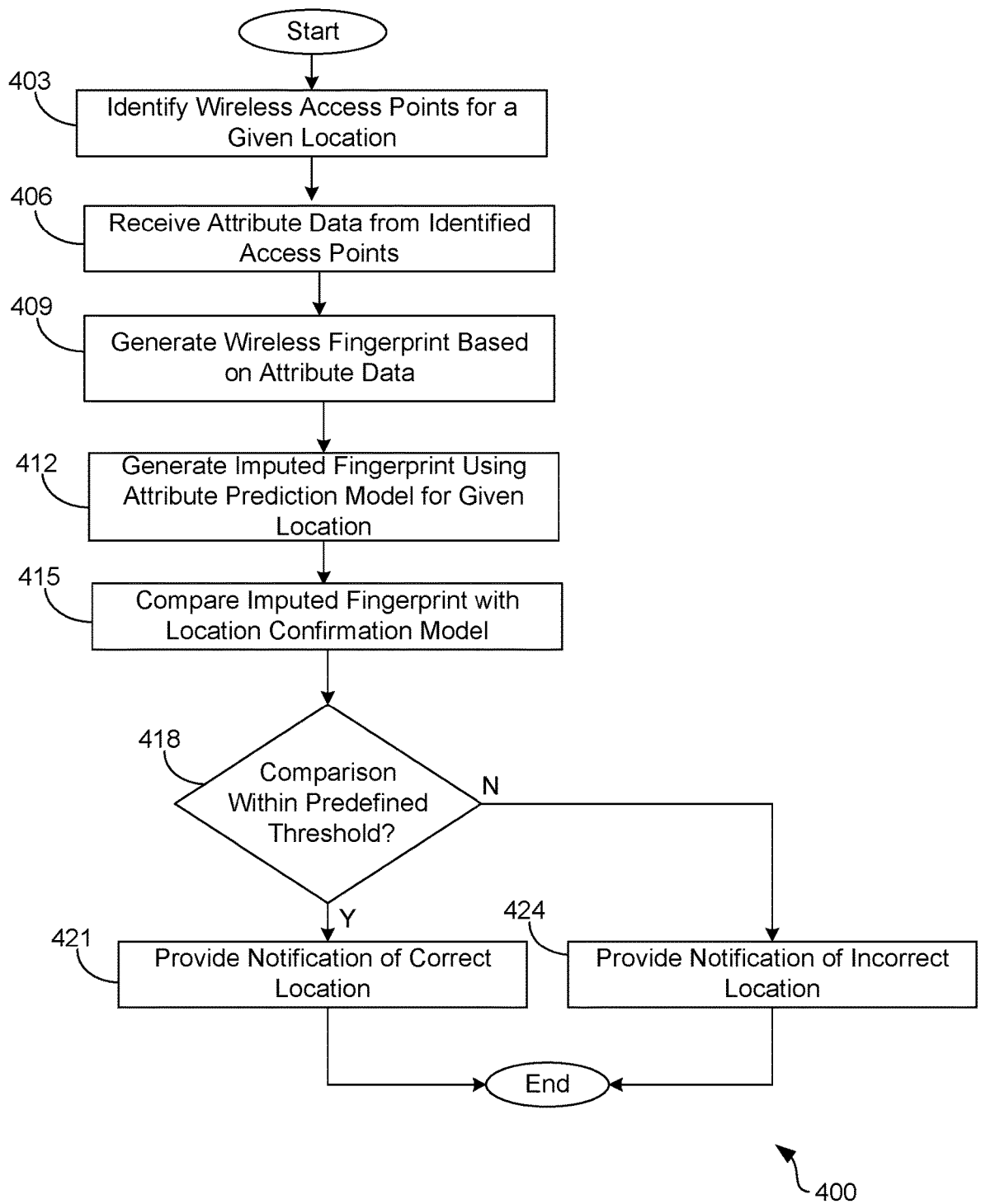
FIG. 4 is a flowchart illustrating one example of functionality implemented as a portion of a client confirmation service executed in a client device in the networked environment of FIG. 2 according to various embodiments of the present disclosure.

Referring next to FIG. 4, shown is a flowchart 400 that provides one example of the operation of a portion of the client confirmation application 227 (FIG. 2) according to various embodiments. It is understood that the flowchart of FIG. 4 provides merely an example of the many different types of functional arrangements that may be employed to implement the operation of the portion of the client confirmation application 227 as described herein. As an alternative, the flowchart of FIG. 4 may be viewed as depicting an example of elements of a method implemented in the client device 103 (FIG. 1) according to one or more embodiments.

FIG. 4 provides a non-limiting example of the functionality that may be performed by the client confirmation application 227 during the online phase of wireless localization. Specifically, FIG. 4 provides a non-limiting example of generating a wireless fingerprint 112 (FIG. 1) and using a pretrained attribute prediction model 115 (FIG. 1) and a pretrained location confirmation model for the given location to confirm accuracy of the location using the generated wireless fingerprint 112.

Beginning with box 403, the client confirmation application 227 can perform a wireless scan (e.g., a Wi-Fi scan) to identify wireless AP devices 106 (FIG. 1) in the surrounding area 109 (FIG. 1). The client confirmation application 227 can perform an active or passive wireless scan to identify AP devices 106 and obtain attribute data 259 (e.g., signal strength, device identifier, AP device location, etc.). For example, in active scanning, the client confirmation application 227 via the transceiver 247 can transmit a request for AP devices 106 and then can identify AP devices 106 in response to received responses. In passive scanning, the client confirmation application 227 via the transceiver 247 may listen for broadcasts from AP devices 106 through different channels.

At box 406, the client confirmation application 227 can obtain the attribute data 259 from the identified AP devices 106. The attribute data 259 (FIG. 2) may be included in the response and/or broadcast received from the AP device 106 upon identification. In some examples, the attribute data 259 is received following an additional request to the identified AP devices 106.

At box 409, the client confirmation application 227 generates a collected wireless fingerprint 112 using the attribute data 259 obtained from the identified AP devices 106. Since the client confirmation application 227 likely fails to identify all AP devices 106 in the surrounding area 109 and/or the client confirmation application 227 fails to receive attribute data 259 from all of the identified AP devices 106, the collected wireless fingerprint 112 is incomplete as it is missing attribute data 259 for unseen AP devices 106.

At box 412, the client confirmation application 227 reconstructs the collected wireless fingerprint 112 to include the estimated missing attribute data 259 and thereby generate an imputed wireless fingerprint 121 (FIG. 1) according to various examples of the present disclosure. In particular, the client confirmation application 227 can apply a previously trained attribute prediction model 115 for the given location to the collected wireless fingerprint 112 to generate the imputed wireless fingerprint 121. In some examples, the client confirmation application 227 can request the attribute prediction model 115 for the given location from the confirmation service 218 (FIG. 2). In other examples, the client confirmation application 227 obtains the attribute prediction models 115 for all delivery locations for a given time period from the confirmation service 218, in response to providing the confirmation service 218 the event data 230 (FIG. 2) associated with the given time period.

At box 415, the client confirmation application 227 compares the imputed wireless fingerprint 121 to a trained location confirmation model 118 (FIG. 2) to determine if the location of the client device 103 (e.g., delivery agent) is correct. In some examples, the client confirmation application 227 can request the location confirmation model 118 for the given location from the confirmation service 218. In other examples, the client confirmation application 227 obtains the location confirmation models 118 for all delivery locations for a given time period from the confirmation service 218, in response to providing the confirmation service 218 the event data 230 for the given time period.

At box 418, the client confirmation application 227 determines with the comparison is within a predefined threshold that is defined in the location confirmation rules 236 (FIG. 2). For example, the client confirmation application 227 can determine a similarity score generated in response to the comparison of the imputed wireless fingerprint 121 with the location confirmation model 118. If the similarity score is within the predefined threshold defined in the location confirmation rules 236, the location is determined to be correct and the process proceeds to box 421. However, if the similarity score is outside of the predefined threshold, the location may be determined to be incorrect and the process proceeds to box 424.

At box 421, the client confirmation application 227 generates a notification indicating that the location is a correct location. Upon generating the notification, the client confirmation application 227 can cause the notification to be rendered on the client device 103 to notify the user (e.g., delivery agent) associated with the client device 103, accordingly. Thereafter, this portion of the process proceeds to completion.

At box 424, the client confirmation application 227 generates a notification indicating that the location associated with the client device 103 is an incorrect location. Upon generating the notification, the client confirmation application 227 can cause the notification to be rendered on the client device 103 to notify the user (e.g., delivery agent) associated with the client device 103, accordingly. Thereafter, this portion of the process proceeds to completion.

Figure 5:
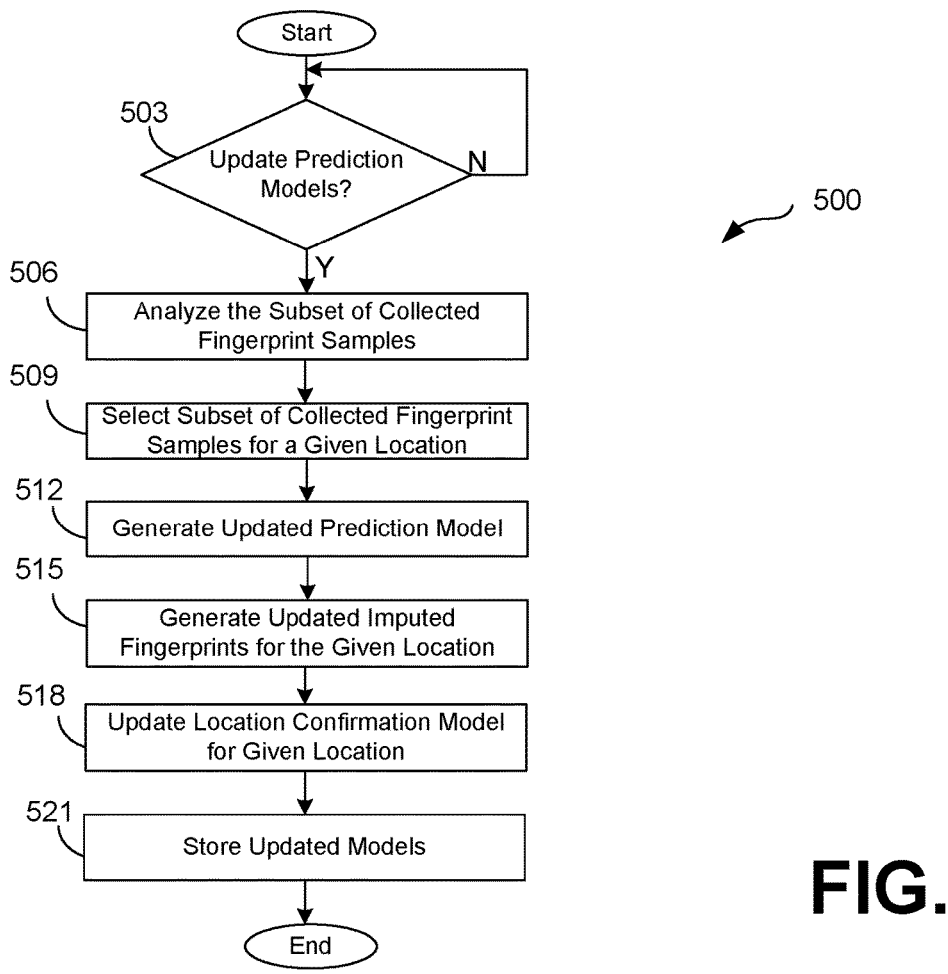
FIG. 5 is a flowchart illustrating one example of functionality implemented as portions of the confirmation service, the attribute prediction engine, and the location confirmation engine executed in a computing environment in the networked environment of FIG. 2 according to various embodiments of the present disclosure.

Referring next to FIG. 5, shown is a flowchart that provides one example of the operation of the portions of the confirmation service 218 (FIG. 2), the attribute prediction engine 221 (FIG. 2), and the location confirmation engine 224 (FIG. 2) according to various embodiments. It is understood that the flowchart of FIG. 5 provides merely an example of the many different types of functional arrangements that may be employed to implement the operation of the portions of the confirmation service 218, the attribute prediction engine 221, and the location confirmation engine 224 as described herein. As an alternative, the flowchart of FIG. 5 may be viewed as depicting an example of elements of a method implemented in the computing environment 203 (FIG. 2) according to one or more embodiments.

FIG. 5 provides a non-limiting example of the functionality that may be performed by the confirmation service 218, the attribute prediction engine 221, and the location confirmation engine 224 during an update of the survey phase of wireless localization. Specifically, FIG. 5 provides a non-limiting example of updating the attribute prediction models 115 (FIG. 1) and location confirmation models 118 (FIG. 2) for different locations according to various embodiments of the present disclosure.

Beginning with box 503, the confirmation service 218 determines whether an attribute prediction model 115 requires an update. The confirmation service 218 can determine that the attribute prediction model 115 requires an update in response to determining that the previously trained attribute prediction model 115 is outdated, a periodic frequency (e.g., daily, weekly, monthly), and/or other factors as can be appreciated. The previously trained attribute prediction model 115 can be considered outdated according to an analysis of various factors including, for example, a timestamp associated with the creation of the attribute prediction model 115 being outside a predefined threshold, an identification of an addition of one or more AP devices 106 (FIG. 1) in the surrounding area 109 (FIG. 1), an identification of a removal of one or more AP devices 106 in the surrounding area 109, a number of complaints received of incorrect deliveries, and/or other factors. If the confirmation service 218 determines that an update is required, the confirmation service proceeds to box 506. Otherwise, the confirmation service 218 remains at box 503 until an update is determined to be required.

At box 506, the attribute prediction engine 221 can analyze the attributes of each received collected wireless fingerprint 112 (FIG. 1). For example, the attributes can include the signal strength (e.g., RSSI), a location of the identified AP device 106, a device identifier (e.g., BSSID, SSID), a timestamp associated with the generation of the wireless fingerprint 112, and other attributes as can be appreciated.

At box 509, the attribute prediction engine 221 selects a subset of collected wireless fingerprint samples stored in the data store 215 (FIG. 2). According to various embodiments, the attribute prediction engine 221 may select at least a subset of the collected wireless fingerprints 112 for the given location. The selected wireless fingerprints 112 can be used for updating the attribute prediction model 115 for the given location. For example, selection of the collected wireless fingerprints 112 can be based at least in part on a recency of collection (e.g., timestamps associated with the collected wireless fingerprints 112), an identified change in the AP environment for a given location (e.g., addition or removal of AP device 106), and whether a particular collected wireless fingerprint 112 includes attribute data 259 (FIG. 2) associated with the added or removed AP device 106, a number of required samples, a success of an associated delivery at the given location, and/or other factors.

At box 512, the attribute prediction engine 221 updates the attribute prediction model 115 for the given location according to the selected collected wireless fingerprints 112. For example, the attribute prediction engine 221 can retrain the attribute prediction model 115 according to a description set forth in box 312 of FIG. 3.

At box 515, the attribute prediction engine 221 generates updated imputed wireless fingerprints 121 (FIG. 1). The imputed wireless fingerprints 121 can be generated from a subset of collected wireless fingerprints 112 over a period of time. In some examples, the updated imputed wireless fingerprints 121 are generated using one or more of the collected wireless fingerprints 112 used to update the attribute prediction model 115. In other examples, the updated imputed wireless fingerprints 121 are generated using samples of collected wireless fingerprints 112 that were not selected for updating the attribute prediction model 115. The updated imputed wireless fingerprints 121 are generated to include the missing attributes of the unseen AP devices 106 according to the attribute prediction model 115.

At box 518, the location confirmation engine 224 updates the location confirmation model 118 for the given location according to the location confirmation rules 236 (FIG. 2), and updated imputed wireless fingerprints 121 generated for training the location confirmation model 118. In particular, the location confirmation engine 224 can use the updated imputed wireless fingerprints 121 that are generated to include the missing attribute data 259 of the unseen AP devices 106.

At box 521, the location confirmation engine 224 stores the location confirmation model 118 for the given location in the data store 215. In addition, the attribute prediction engine 221 may store the updated attribute prediction model 115 in association with the given location in the data store 215. Thereafter, this portion of the process proceeds to completion.

Figure 6:
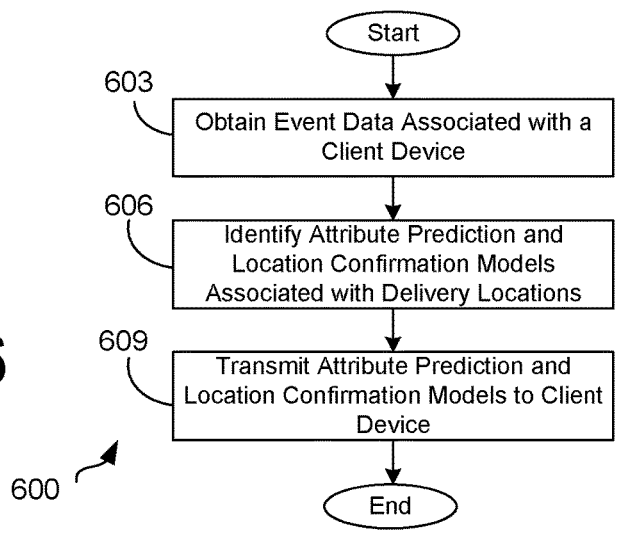
FIG. 6 is a flowchart illustrating one example of functionality implemented as portions of the confirmation service executed in a computing environment in the networked environment of FIG. 2 according to various embodiments of the present disclosure.

Referring next to FIG. 6, shown is a flowchart that provides one example of the operation of a portion of the confirmation service 218 (FIG. 2) according to various embodiments. It is understood that the flowchart of FIG. 6 provides merely an example of the many different types of functional arrangements that may be employed to implement the operation of the portion of the confirmation service 218 as described herein. As an alternative, the flowchart of FIG. 6 may be viewed as depicting an example of elements of a method implemented in the computing environment 203 (FIG. 2) according to one or more embodiments.

Beginning with box 603, the confirmation service 218 obtains event data 230 (FIG. 2) associated with a client device 103 (FIG. 1). For example, the client device 103 may be associated with a delivery agent and the event data 230 includes the different delivery locations that the delivery agent is scheduled to deliver items at during a predefined period of time (e.g., day, week, range of hours, etc.). In some examples, the confirmation service 218 can obtain the event data 230 upon a request to the client device 103. In other examples, the event data 230 may be stored in the data store 215 FIG. 2) in association with the delivery agent data, device data, and/or other appropriate data. In this example, the confirmation service 218 may obtain the event data 230 in response to a request to the data store 215.

At box 606, the confirmation service 218 identifies the pretrained attribute prediction models 115 (FIG. 1) and location confirmation models 118 (FIG. 2) that are associated with the delivery locations extracted from the event data 230. For example, the attribute prediction models 115 and location confirmation models 118 are associated with location identifiers 241 (FIG. 2) for a given location. By being able to match the location identifiers 241 for the attribute prediction models and location confirmation models 118 with the location identifiers 241 included in the event data 230, the confirmation service 218 can identify the appropriate models.

At box 609, the confirmation service 218 transmits the identified pretrained attribute prediction models 115 and the pretrained location confirmation models 118 for the different locations to the client device 103. Transmitting the attribute prediction models and location confirmation models 118 in advance and in batch to the client device 103 can reduce the processing time and reduce network traffic required associated with each delivery confirmation action performed by the client device 103. Thereafter, this portion of the process proceeds to completion.

Figure 7:
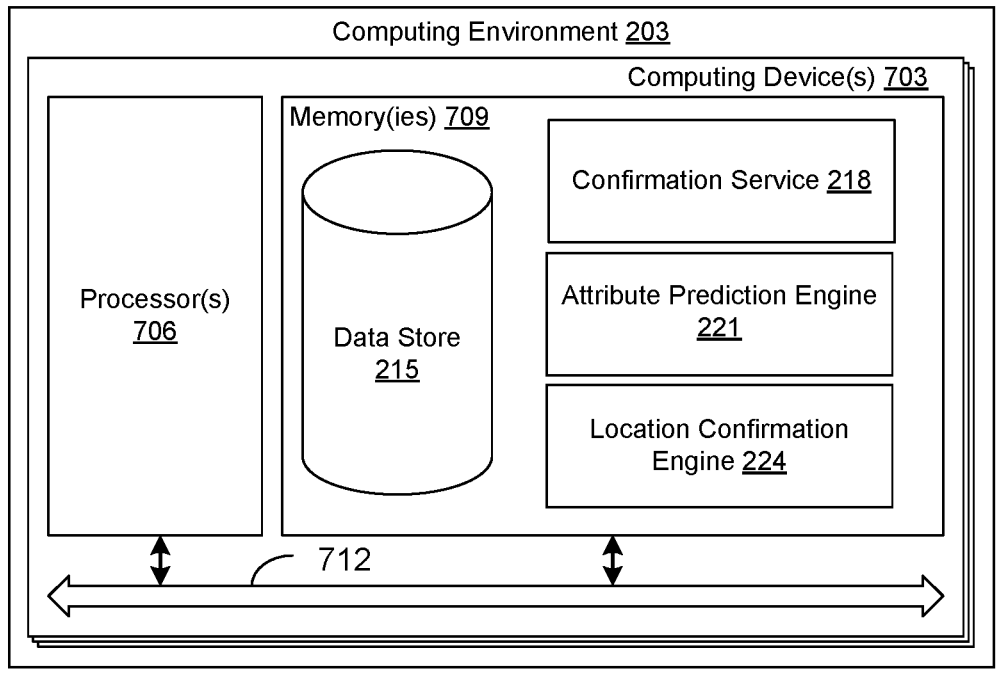
FIG. 7 is a schematic block diagram that provides one example illustration of a computing environment employed in the networked environment of FIG. 2 according to various embodiments of the present disclosure.

With reference to FIG. 7, shown is a schematic block diagram of the computing environment 203 according to an embodiment of the present disclosure. The computing environment 203 includes one or more computing devices 703 Each computing device 703 includes at least one processor circuit, for example, having a processor 706 and a memory 709, both of which are coupled to a local interface 712. To this end, each computing device 703 may comprise, for example, at least one server computer or like device. The local interface 712 may comprise, for example, a data bus with an accompanying address/control bus or other bus structure as can be appreciated.

Stored in the memory 709 are both data and several components that are executable by the processor 706. In particular, stored in the memory 709 and executable by the processor 706 are a confirmation service 218, an attribute prediction engine 221, a location confirmation engine 224, and potentially other applications. Also stored in the memory 709 may be a data store 215 and other data. In addition, an operating system may be stored in the memory 709 and executable by the processor 706.

Figure 8:
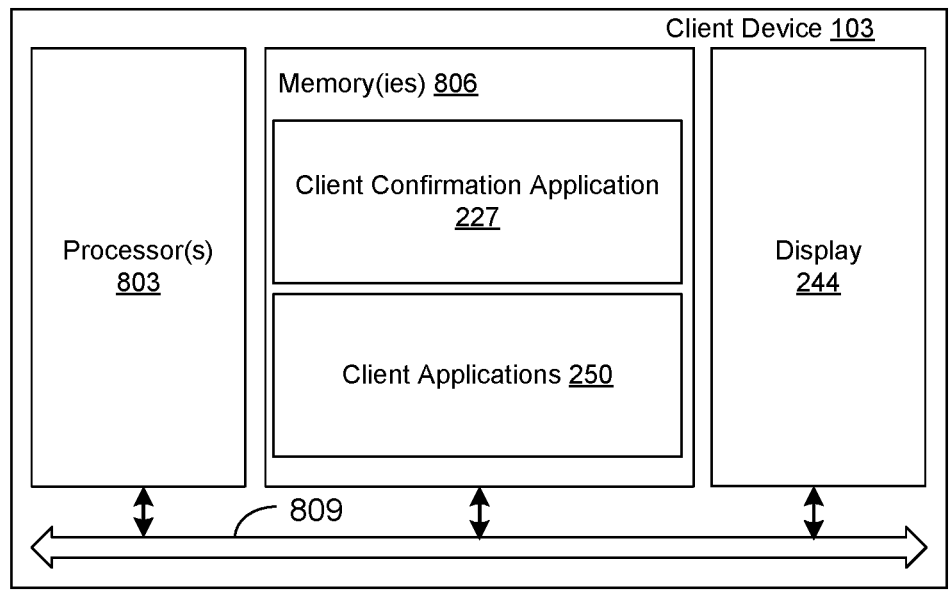
FIG. 8 is a schematic block diagram that provides one example illustration of a client device employed in the networked environment of FIG. 2 according to various embodiments of the present disclosure.

With reference to FIG. 8, shown is a schematic block diagram of the client device 103 (FIG. 1) according to an embodiment of the present disclosure. The client device 103 includes at least one processor circuit, for example, having a processor 803 and a memory 806, both of which are coupled to a local interface 809. The local interface 809 may comprise, for example, a data bus with an accompanying address/control bus or other bus structure as can be appreciated. A display 244 may also be coupled to the local interface 809.

Stored in the memory 806 are both data and several components that are executable by the processor 803. In particular, stored in the memory 806 and executable by the processor 803 are client applications 250, a client confirmation application 227, and potentially other applications. Also stored in the memory 806 may be a data store and other data. In addition, an operating system may be stored in the memory 806 and executable by the processor 803.

Referring now to both FIGS. 7 and 8, it is understood that there may be other applications that are stored in the memory 709, 806 and are executable by the processor 706, 803 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 709, 806 and are executable by the processor 706, 803. In this respect, the term "executable" means a program file that is in a form that can ultimately be run by the processor 706, 803. Examples of executable programs may be, for example, a compiled program that can be translated into machine code in a format that can be loaded into a random access portion of the memory 709, 806 and run by the processor 706, 803, source code that may be expressed in proper format such as object code that is capable of being loaded into a random access portion of the memory 709, 806 and executed by the processor 706, 803, or source code that may be interpreted by another executable program to generate instructions in a random access portion of the memory 709, 806 to be executed by the processor 706, 803, etc. An executable program may be stored in any portion or component of the memory 709, 806 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 709, 806 is defined herein as including both volatile and nonvolatile memory and data storage components. Volatile components are those that do not retain data values upon loss of power. Nonvolatile components are those that retain data upon a loss of power. Thus, the memory 709, 806 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 706, 803 may represent multiple processors 706, 803 and/or multiple processor cores and the memory 709, 806 may represent multiple memories 709, 806 that operate in parallel processing circuits, respectively. In such a case, the local interface 712, 809 may be an appropriate network that facilitates communication between any two of the multiple processors 706, 803, between any processor 706, 803 and any of the memories 709, 806, or between any two of the memories 709, 806, etc. The local interface 712, 809 may comprise additional systems designed to coordinate this communication, including, for example, performing load balancing. The processor 706, 803 may be of electrical or of some other available construction.

Although the confirmation service 218, the attribute prediction engine 221, the location confirmation engine 224, the client confirmation application 227, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3-6 show the functionality and operation of an implementation of portions of the confirmation service 218, the attribute prediction engine 221, the location confirmation engine 224, and the client confirmation application 227. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 706, 803 in a computer system or other system. The machine code may be converted from the source code, etc. If embodied in hardware, each block may represent a circuit or a number of interconnected circuits to implement the specified logical function(s).

Although the flowcharts of FIGS. 3-6 show a specific order of execution, it is understood that the order of execution may differ from that which is depicted. For example, the order of execution of two or more blocks may be scrambled relative to the order shown. Also, two or more blocks shown in succession in FIGS. 3-6 may be executed concurrently or with partial concurrence. Further, in some embodiments, one or more of the blocks shown in FIGS. 3-6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the confirmation service 218, the attribute prediction engine 221, the location confirmation engine 224, the client confirmation application 227, that comprises software or code can be embodied in any non-transitory computer-readable medium for use by or in connection with an instruction execution system such as, for example, a processor 706, 803 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the confirmation service 218, the attribute prediction engine 221, the location confirmation engine 224, the client confirmation application 227, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 703, or in multiple computing devices 703 in the same computing environment 203.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
   at least one computing device; and
   at least one application executable on the at least one computing device, wherein, when executed, the at least one application causes the at least one computing device to at least:
   collect a plurality of wireless fingerprints associated with a particular location based at least in part on a plurality of item deliveries associated with the particular location, individual wireless fingerprints of the plurality of wireless fingerprints comprising one or more attributes associated with a respective subset of wireless access points of a plurality of wireless access points located within a predefined area of the particular location;
   generate an attribute prediction model based at least in part on the plurality of wireless fingerprints, the attribute prediction model being configured to estimate one or more missing attributes associated with individual wireless access points of the plurality of wireless access points that are missing from the respective subset of wireless access points of the individual wireless fingerprints;
   generate a plurality of imputed wireless fingerprints based at least in part on the attribute prediction model and the plurality of collected wireless fingerprints, individual imputed wireless fingerprints of the plurality of imputed wireless fingerprints including an estimation of the one or more missing attributes for the individual wireless access points missing from the respective subset of wireless access points;
   generate a location confirmation model for the particular location based on the plurality of imputed wireless fingerprints; and
   transmit the attribute prediction model and the location confirmation model to a client device, the client device being configured to confirm an accuracy of a delivery of an item at the particular location based at least in part on the attribute prediction model and the location confirmation model.

2. The system of claim 1, wherein the one or more attributes include a device identifier, a signal strength, and corresponding locations of the respective subset of wireless access points.

3. The system of claim 1, wherein, when executed, the at least one application further causes the at least one computing device to at least store the attribute prediction model and the location confirmation model in a data store in association with a location identifier of the particular location.

4. The system of claim 1, wherein a first subset of wireless access points associated with a first wireless fingerprint excludes at least one wireless access point that is included in a second subset of wireless access points associated with a second wireless fingerprint.

5. A method, comprising:
   collecting, by at least one computing device, a plurality of wireless fingerprints associated with a particular location based at least in part on a plurality of item deliveries associated with the particular location, individual wireless fingerprints of the plurality of wireless fingerprints comprising one or more attributes associated with a respective subset of wireless access points of a plurality of wireless access points located within a predefined area of the particular location;
   generating, by the at least one computing device, an attribute prediction model based at least in part on the plurality of wireless fingerprints, the attribute prediction model being configured to estimate one or more missing attributes associated with individual wireless fingerprints of the plurality of wireless access points that are missing from the respective subset of wireless access points of the individual wireless fingerprints;
   modifying, by the at least one computing device, the plurality of wireless fingerprints to include an estimation of the one or more missing attributes for the individual wireless access points missing from the respective subset of wireless access points, the plurality of wireless fingerprints being modified based at least in part on the attribute prediction model;
   generating, by the at least one computing device, a location confirmation model for the particular location based at least in part on the plurality of modified wireless fingerprints; and
   confirming an accuracy of a delivery of an item at the particular location based at least in part on the attribute prediction model and the location confirmation model.

6. The method of claim 5, wherein the plurality of wireless fingerprints are collected over a period of time based at least in part on the plurality of item deliveries associated with the particular location.

7. The method of claim 5, further comprising receiving, by the at least one computing device, the individual wireless fingerprints from at least one client device.

8. The method of claim 5, wherein generating the attribute prediction model further comprises determining a respective correlation between at least two wireless access points of the plurality of wireless access points based at least in part on at least one of a variation of signal strength between the at least two wireless access points or a respective distance between a respective wireless access point of the at least two wireless access points and the particular location.

9. The method of claim 5, further comprising:
   generating model data comprising the attribute prediction model and the location confirmation model; and
   transmitting the model data to a client device.

10. The method of claim 9, further comprising:
    receiving event data associated with the client device; and determining that the particular location is included in the event data, wherein the model data is transmitted to the client device in response to determining that the particular location is included in the event data.

11. The method of claim 5, wherein the plurality of wireless fingerprints comprises a first plurality of wireless fingerprints and further comprising:
   determining that the attribute prediction model is to be updated; and
   in response to determining that the attribute prediction model is to be updated:
      updating the attribute prediction model based at least in part on a second plurality of wireless fingerprints; and
      modifying the second plurality of wireless fingerprints based at least in part on the updated attribute prediction model; and
   updating the location confirmation model based at least in part on the modified second plurality of wireless fingerprints.

12. The method of claim 11, wherein determining that the attribute prediction model is to be updated is based at least in part on at least one of a number of wireless fingerprints meeting or exceeding a predefined threshold or a respective timestamp associated with a respective wireless fingerprint of the plurality of wireless fingerprints.

13. The method of claim 11, wherein determining that the attribute prediction model is to be updated is based at least in part on a periodic frequency.

14. A system, comprising:
   a client device; and
   at least one application executable in the client device, wherein when executed the at least one application causes the client device to at least:
      collect a plurality of wireless fingerprints associated with a particular location based at least in part on a plurality of item deliveries associated with the particular location, individual wireless fingerprints of the plurality of wireless fingerprints comprising one or more attributes associated with a respective subset of wireless access points of a plurality of wireless access points located within a predefined area of the particular location;
      generate a first wireless fingerprint based at least in part on attribute data associated with a first subset of wireless devices of a plurality of wireless devices associated with a client device location corresponding to the plurality of item deliveries, the first wireless fingerprint missing attribute data for a second subset of wireless devices of the plurality of wireless devices;
      estimate the missing attribute data for the second subset of wireless devices based at least in part on an attribute prediction model, the attribute prediction model being configured to estimate one or more missing attributes associated with individual wireless access points of the plurality of wireless access points that are missing from the respective subset of wireless access points of the individual wireless fingerprints;
      generate a second wireless fingerprint based at least in part on the estimated missing attribute data of the attribute prediction model and the first wireless fingerprint, including an estimation of the one or more missing attributes for the individual wireless access points missing from the respective subset of wireless access points;
      generate a location confirmation model for the particular location based at least in part on the second wireless fingerprint; and
      confirm that the client device location is within a predefined area associated with a delivery of an item at the particular location based at least in part on the second wireless fingerprint and the location confirmation model.

15. The system of claim 14, wherein the attribute data comprises at least one of a respective device identifier of a respective wireless access point device of the first subset of wireless devices, a wireless access point device location, and a signal strength of a respective wireless device.

16. The system of claim 14, wherein, when executed, the at least one application further causes the client device to at least:
   receive a request from at least one computing device for event data associated with the client device; and
   provide the event data to the at least one computing device.

17. The system of claim 16, wherein, when executed, the at least one application further causes the client device to at least receive the location confirmation model and the attribute prediction model for the particular location from the at least one computing device based at least in part on the event data.

18. The system of claim 14, wherein, when executed, the at least one application causes the client device to at least:
   generate a notification indicating an accuracy of the client device location with respect to the particular location; and
   render the notification on a display of the client device.

19. The system of claim 14, wherein, when executed, the at least one application causes the client device to at least:
   identify the first subset of wireless devices; and
   obtain the attribute data being broadcasted from the first subset of wireless devices.

20. The system of claim 14, wherein the attribute prediction model is generated based at least in part on a plurality of previously collected wireless fingerprints associated with the particular location.

* * * * *

UNITED STATES PATENT AND TRADEMARK OFFICE
CERTIFICATE OF CORRECTION

PATENT NO. : 11,307,286 B1  
APPLICATION NO. : 16/900004  
DATED : April 19, 2022  
INVENTOR(S) : Zheng Wang, Shao-Wen Yang and Valerie Galluzzi Liptak Page 1 of 1

It is certified that error appears in the above-identified patent and that said Letters Patent is hereby corrected as shown below:

On the Title Page

Item (72) Inventors should read:  
Zheng Wang, Sammamish, WA (US)  
Shao-Wen Yang, Redmond, WA (US)  
Valerie Galluzzi Liptak, Mill Creek, WA (US)

Signed and Sealed this  
Thirteenth Day of February, 2024

Katherine Kelly Vidal  
*Director of the United States Patent and Trademark Office*